United States Patent
Katayama et al.

(10) Patent No.: US 7,308,880 B2
(45) Date of Patent: Dec. 18, 2007

(54) STARTING DEVICE FOR INTERNAL COMBUSTION ENGINE

(75) Inventors: Takatsugu Katayama, Kanagawa (JP); Naoki Osada, Kanagawa (JP); Yoshitaka Matsuki, Kanagawa (JP); Hidehiro Fujita, Kanagawa (JP); Masahiko Yuuya, Kanagawa (JP); Atsushi Mitsuhori, Kanagawa (JP); Tadanori Yanai, Kanagawa (JP); Shouta Hamane, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 84 days.

(21) Appl. No.: 11/347,084

(22) Filed: Feb. 3, 2006

(65) Prior Publication Data

US 2006/0180112 A1 Aug. 17, 2006

(30) Foreign Application Priority Data

Feb. 4, 2005 (JP) ............................. 2005-028968

(51) Int. Cl.
*F02M 1/00* (2006.01)
*F02N 17/00* (2006.01)

(52) U.S. Cl. ............................. 123/179.4; 123/179.16
(58) Field of Classification Search ............. 123/179.3, 123/179.4, 179.16
See application file for complete search history.

(56) References Cited

U.S. PATENT DOCUMENTS 6,098,585 A * 8/2000 Brehob et al. ........... 123/179.5
6,807,934 B2 * 10/2004 Kataoka et al. .......... 123/179.4
6,895,916 B2 * 5/2005 Kaneko et al. .......... 123/179.4
2004/0200448 A1 * 10/2004 Kojima et al. ........... 123/179.3
2004/0237938 A1 * 12/2004 Oono et al. ............. 123/179.16

FOREIGN PATENT DOCUMENTS

JP 02-271073 11/1990

OTHER PUBLICATIONS

English Abstract of JP02-271073.

* cited by examiner

*Primary Examiner*—Stephen K. Cronin
*Assistant Examiner*—Arnold Castro
(74) *Attorney, Agent, or Firm*—Radar, Fishman & Grauer, PLLC

(57) ABSTRACT

A starting system rotates and starts an internal combustion engine by injecting fuel into a predetermined cylinder using an injector and igniting the fuel using an ignition plug, and upon starting the engine, the fuel pressure supplied to the injector is detected, and the engine is started by combustion in the predetermined cylinder only when the detected pressure is at or greater than the predetermined pressure, thereby guaranteeing the fuel pressure when combustion starting is employed, and consequently the engine can be securely started. In operation, the present starting system rotates and starts the engine by injecting the fuel into a predetermined cylinder using the injector and igniting the fuel using the ignition plug, and upon starting the engine, the fuel pressure supplied to the injector is detected, and the engine is started by combustion in the predetermined cylinder only when the detected pressure is at or greater than the predetermined pressure, thereby guaranteeing the fuel pressure when combustion starting is employed, and consequently the engine can be securely started.

13 Claims, 7 Drawing Sheets

STARTING DEVICE FOR INTERNAL COMBUSTION ENGINE

RELATED APPLICATION

The disclosure of Japanese Patent Application No. 2005-028968, filed Feb. 4, 2005, including its specification, claims and drawings, is incorporated herein by reference in its entirety.

FIELD

Described herein is a starting system for an internal combustion engine, and more specifically, a device for starting an engine by combustion in a specific cylinder without relying on a starter that employs an electric motor or the like.

BACKGROUND

In starting an internal combustion engine without using a starter, the related art is described as follows. Upon starting the engine, the cylinder that stopped at the expansion stroke is detected, the detected cylinder is fired, and by this combustion the engine is rotated and thus started. See Japanese Patent Publication No. H02-271073 (Page 2, upper left column, lines 7 to 14).

SUMMARY OF THE INVENTION

After the stopping of an engine, however, the fuel pressure at the fuel injection system may not be maintained at as high a pressure as that prior to the stopping and it gradually decreases with time. If the fuel pressure has been reduced beyond a certain level of pressure, a sufficient injection pressure for the injector cannot be obtained during the starting of the engine at the next round (to recover the fuel pressure, the engine is required to be started); therefore sufficient vaporization of the injected fuel cannot be obtained, and thus satisfactory starting may not be obtained.

The present internal combustion engine takes into account the above-described problem, and provides improved an internal combustion engine that employs combustion starting, such that starting failure due to reduction of fuel pressure can be avoided and the engine can be securely started.

The present starting system is provided in an internal combustion engine having: a fuel pump driven by the output of the engine; an injector that directly injects the fuel supplied by the fuel pump into the combustion chamber; and an ignition plug for igniting the fuel injected by the injector. In operation, the present starting system rotates and starts the engine by injecting the fuel into a predetermined cylinder using the injector and igniting the fuel using the ignition plug, and upon starting the engine, the fuel pressure supplied to the injector is detected, and the engine is started by combustion in the predetermined cylinder only when the detected pressure is at or greater than the predetermined pressure, thereby guaranteeing the fuel pressure when combustion starting is employed, and consequently the engine can be securely started.

DESCRIPTION OF THE DRAWINGS

These and other features and advantages of the present starting system will be apparent from the ensuing description, taken in conjunction with the accompanying drawings, in which.

DETAILED DESCRIPTION OF THE ILLUSTRATED EMBODIMENTS

Figure 1:
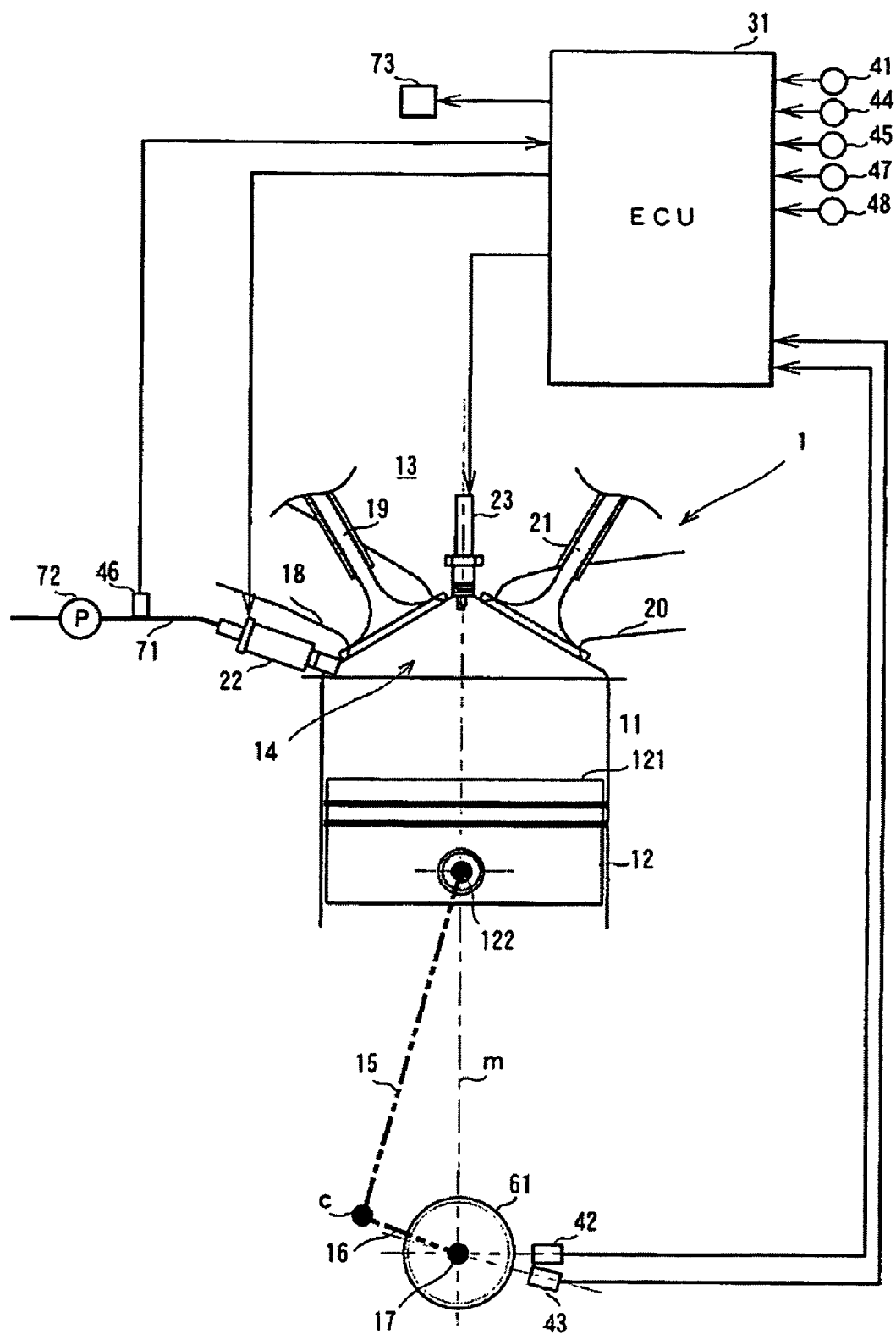
FIG. 1 is a schematic representation of a combustion engine equipped with a first embodiment of the present starting system.

In FIG. 1, engine 1 is a so-called direct-injection-type gasoline-fueled internal combustion engine.

A piston 12 is received in a cylinder block 11 and the space formed between the crown surface 121 of the piston 12 and the bottom surface of the cylinder head 13 becomes a combustion chamber 14. The piston 12 is connected to a crankshaft 17 via a connecting rod 15 and a crank arm 16, and the crankshaft 17 rotates by interlocking with the reciprocating motion of the piston 12. According to the present embodiment, the center 122 of the piston boss is configured on the center axis m of the cylinder in the cross-section in FIG. 1, which includes the center axis m of the cylinder; nonetheless, the center 122 of the piston boss can be configured in this cross-section so that by being offset the junction c of the connecting rod 15 and the crank arm 16 will pass through the center 122 as well as pass through in front of the upper dead center on a straight line parallel to the center axis m of the cylinder.

An inlet port 18 is formed in the cylinder head 13 to one side of the center axis m of the cylinder, and is connected to an inlet manifold (not shown) to form an inlet path. The inlet port 18 is opened and closed by an inlet valve 19. An exhaust port 20 is formed on the other side of the center axis m of the cylinder, and is connected to an exhaust manifold (not shown) to form an exhaust path. The exhaust port 20 is opened and closed by an exhaust valve 21. Two of each of the inlet ports 19 and the exhaust ports 20 are provided in each cylinder, aligned in the direction of alignment of the cylinders. The inlet valve 19 and exhaust valve 21 are driven by an inlet cam and exhaust cam (not shown) provided on the upper side of each valve 19 and 21, respectively.

An injector 22 for supplying fuel is arranged on the cylinder head 13 to face the combustion chamber 14 and directly injects fuel into the combustion chamber 14. According to the present embodiment the injector 22 is arranged between two inlet ports 18 and 18 and the fuel is injected into the combustion chamber 14 from the side. Compressed fuel is fed by a fuel pump 72 to the injector 22 via a fuel pipe 71 connected to a fuel tank (not shown). According to the present embodiment, the fuel pump 72 is connected to one end of the cam shaft (not shown) and is driven by the output of the engine 1. An ignition plug 23 for igniting the fuel injected by the injector 22 is provided on the center axis m of the cylinder. Operation of the injector 22 (and the fuel pump 72) and the ignition plug 23 are controlled by the engine control unit 31 described below.

Operation of the engine 1 is comprehensively controlled by an engine control unit (hereinafter referred to as "ECU") 31. Signals are received by the ECU 31 from an accelerator sensor 41 that detect the aperture of the accelerator, from crank angle sensors 42 to 44 (the engine rotational speed can be calculated based on these), from a temperature sensor 45 that detects the temperature of the coolant, and from a pressure sensor 46 that detects the fuel pressure inside the fuel pipe 71 (hereinafter referred to as the fuel pressure), as well as from an ignition switch 47 and a start switch 48. Based on these signals, the ECU 31 calculates and sets the injection volume, the timing of the injector 22, and the ignition period of the ignition plug 23.

According to the present embodiment, three crank angle sensors 42 to 44 are provided in order to detect the precise stopping position of the crank shaft 17 at the stopping of the engine 1. From among these, two sensors 42 and 43 are provided for the primary rotor 61 attached on the crankshaft 17. Concave and convex shapes are formed at intervals of 30 degrees on the circumference of the primary rotor 61 and the sensors 42 and 43 generate a position signal at every 30 degrees of the crank angle depending on these concave and convex shapes. In addition, the sensors 42 and 43 are offset-positioned by 15 degrees in the direction of the circumference with the crankshaft at the center, and they generate position signals that are 15 degrees out of phase with each other. The remaining sensor 44 is provided for the secondary rotor (not shown) attached on the camshaft. A projection is formed on the circumference of the secondary rotor and the sensor 44 generates a reference signal every 720 degrees of crank angle as this projection passes by. Using these crank angle sensors 42 to 44, the stopping position of the crankshaft 17 can be detected with a precision of 15 degrees.

Based on the detected stopping position, ECU 31 detects the cylinder that stopped during the expansion stroke during the previous stopping, and the detected cylinder is fired to rotate and start the engine 1. The rotational speed of the engine can be detected by counting the position signals from the sensors 42 and 43 for a predetermined period of time, or by measuring the generation cycle of the reference signal from the sensor 44. In the present starting system, the "stopping" of the engine includes an idle stop in which the engine is stopped while the ignition switch is on when a predetermined idle stop condition is established, in addition to the normal stop in which the ignition switch is turned off.

According to the present embodiment, as a starting method for engine 1, combustion starting using combustion as a trigger is employed, but in addition, by taking into account the situation in which starting cannot be effectively carried out using this method, a starter 73, operated by an electric motor, is provided.

Figure 2:
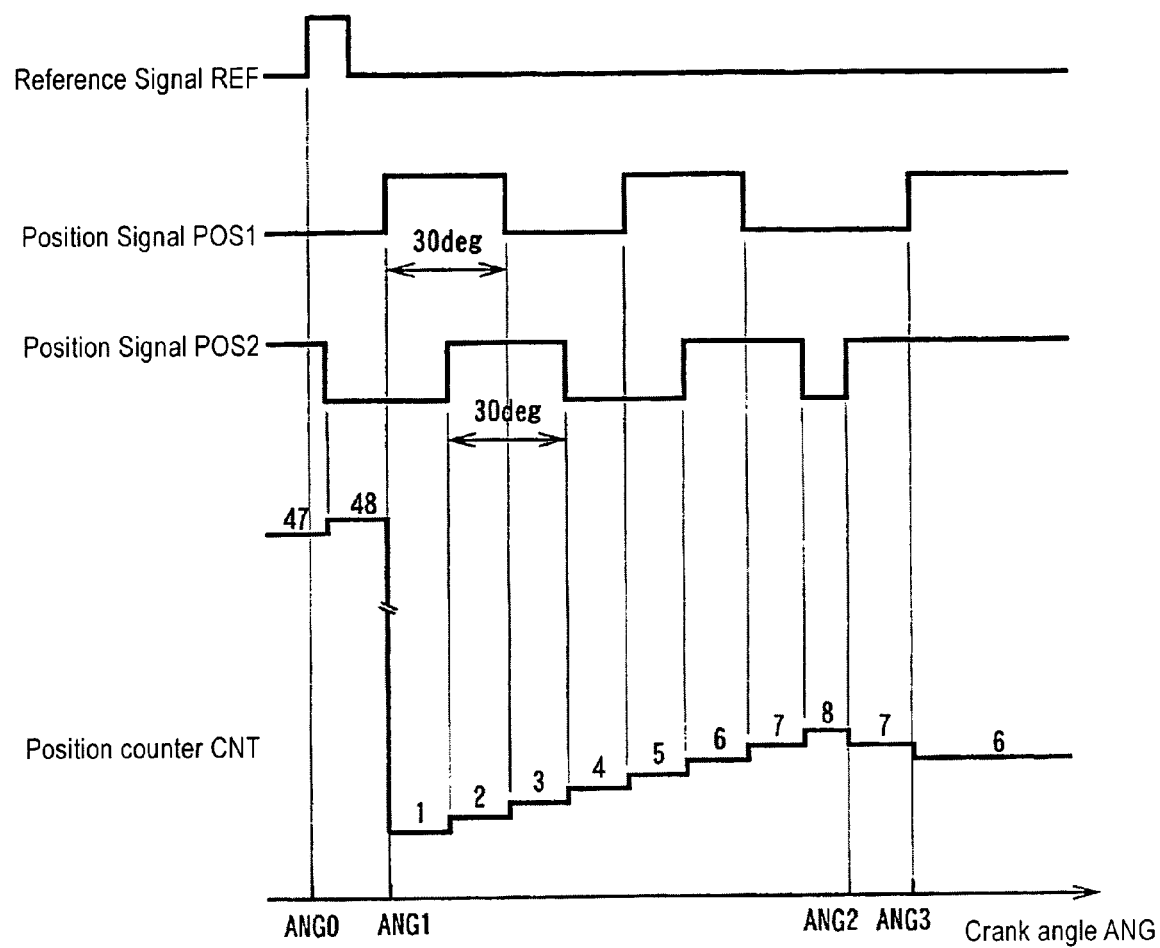
FIG. 2 is a chart showing transition of a location counter relative to output from a crank angle sensor.

FIG. 2 shows the output waveforms for the crank angle sensors 42 to 44 at the stopping of the engine 1.

A position counter CNT that takes a value from 1 to 48 is set for the ECU 31 and the ECU 31 detects the stopping position of the crankshaft 17 based on the value of the position counter CNT at stopping. As described above, the position signals POS1 and POS2 from the sensors 42 and 43 are input every 30 degrees and are out of phase from each other by 15 degrees. The position counter CNT is reset to 1 (angle ANG1) by the input of the next position signal (in this case, POS1) in which the reference signal REF is input, and is incremented by 1 every time position signals POS1, and POS2 are input. When the position signals POS1 and POS2 from the sensors 42 and 43 are alternately input, the position counter CNT is incremented by 1 for each by the input of each POS1 and POS2; nonetheless, when the crankshaft 17 is rotated in reverse immediately prior to complete stopping of rotation upon stopping of the engine 1, position signals from one of the sensors (in this case, POS2) are repeatedly input (angle AGN2). In this case, by subtracting 1 from the position counter CNT, the stopping position incremented with reverse rotation can be detected. Whether or not the rotation is completely stopped can be detected from the fact that neither position signal POS1 nor POS2 are input during a predetermined period of time (angle ANG 3).

Figure 3:
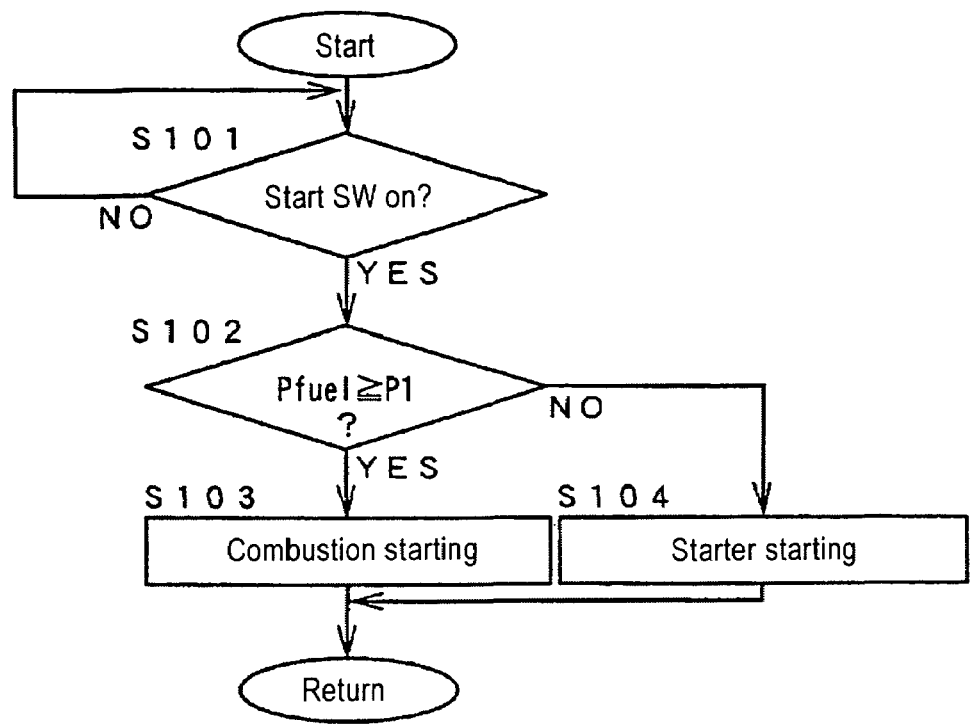
FIG. 3 is a flowchart of a start control process according to the first embodiment.

FIG. 3 is a flowchart of the start control process. This process is activated when the ignition switch 47 is turned on. By following this process, engine 1 starts from the state in which the ignition switch 47 is off.

At step S101, whether or not the start switch 48 is turned on is detected. When it is on, the process advances to step S102, and if it is not on, the detection of step S101 is repeated.

Figure 4:
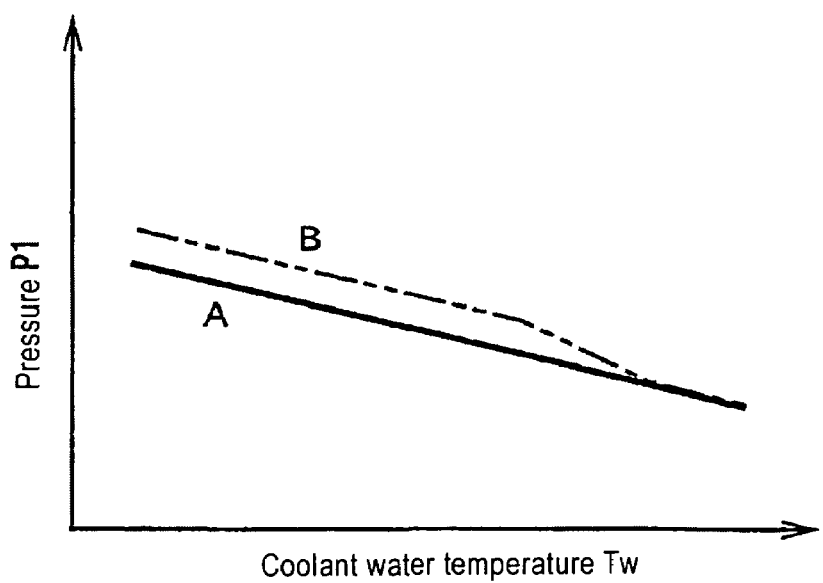
FIG. 4 is a graph showing the combustion start-permitting pressure PI.

At step S102, fuel pressure Pfuel detected by the pressure sensor 46 is read and it is detected whether or not this fuel pressure Pfuel (equivalent to the "primary pressure") is the same as P1 or greater. If it is equal to P1 or greater, the process advances to step S103 and if it is lower than P1, the process advances to step S104. The pressure P1 is set to a value that corresponds to the coolant temperature Tw based on the search result from the chart (linear A) with a trend shown in FIG. 4. In this chart, the pressure P1 is set to be a greater value as the coolant temperature TW becomes lower.

At step S103 the engine 1 is activated by combustion starting, under the presupposition that sufficient fuel pressure Pfuel is secured for starting and a sufficient injection pressure can be obtained by the injector 22. In other words, the cylinder that stopped during the expansion stroke at the previous stopping is detected based on the stopping position of the crankshaft 17 and combustion is generated for this cylinder by executing the injection ignition of the fuel, and thus the engine 1 is started.

At step S104, the engine 1 is activated by cranking of the starter 73 under the presupposition that the required fuel pressure Pfuel is not secured due to reduction of the fuel pressure Pfuel since the previous stopping.

In the present embodiment, the pressure sensor 46 corresponds to the "primary fuel pressure detection means" and the temperature sensor 45 is equivalent to the "temperature detection means". In addition, the process at step S103 in the flowchart shown in FIG. 3 corresponds to the function of the "primary start control means" and the process of step S104 in the same flowchart corresponds to the function of the "secondary start control means." The process at step S102 in the same flowchart includes a function that serves as the "first starting pressure modification means". However, the various elements are not to be limited to a "means plus function" interpretation in the present application, but rather that the indicated means encompass the exemplary physical structure.

As a "temperature detection means," one that detects the temperature of the engine oil or the temperature of the atmosphere can be employed as well as one that detects the coolant temperature.

The direct fuel injection engine employs a high-pressure-type fuel pump that supplies fuel to the injector. Because it requires the formation of a high pressure fuel, this fuel pump is connected to a cam shaft or the like and driven by the output of the engine. After the stopping of an engine, due to its structure, the fuel pressure at the fuel injection system cannot be maintained at as high a pressure as that prior to the stopping and it gradually decreases with time. When a long period of time has passed from the stopping of an engine, and the fuel pressure has been reduced beyond a certain level of pressure, a sufficient injection pressure for the injector cannot be obtained during the starting of the engine at the next round (to recover the fuel pressure, the engine is required to be started); therefore sufficient vaporization of the injected fuel cannot be obtained, and thus satisfactory starting may not be obtained.

According to the present embodiment, upon activation of the engine 1, the fuel pressure Pfuel is detected and only when the fuel pressure Pfuel is the same as the pressure P1 or greater, which is required for injection of the fuel, combustion starting is employed. This allows guaranteeing the fuel pressure Pfuel, thereby securely starting the engine 1 during combustion starting.

Figure 8:
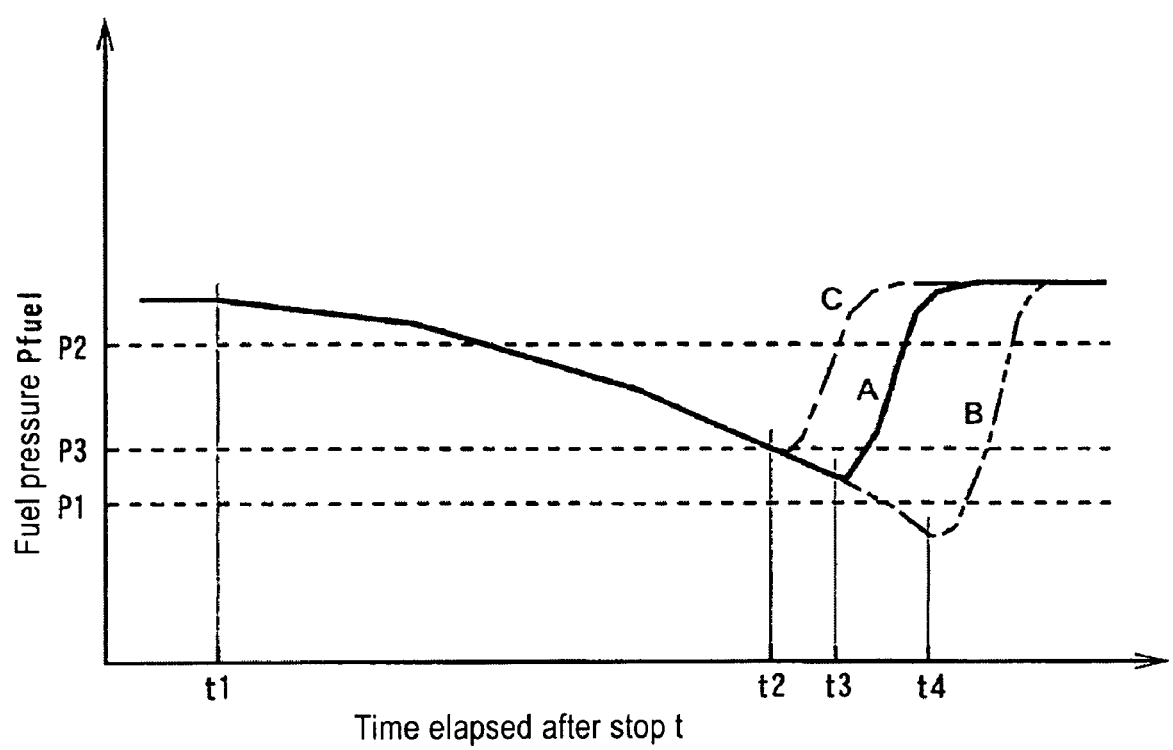
FIG. 8 is a graph showing the transition of the fuel pressure Pfuel after the engine stop.

FIG. 8 shows the transition of the fuel pressure Pfuel after the engine 1 is stopped. After the stop at time t1, the fuel pressure Pfuel gradually decreases along with time elapsing. Here not much time has passed since the previous stop for the next starting, (time t2), and the fuel pressure Pfuel required for injection is secured so that combustion starting can be employed. On the other hand, if a long period of time has passed from the stop to the start (time t4), the fuel pressure Pfuel is so reduced that it is lower than the pressure P1 and therefore the required injection pressure cannot be obtained. If combustion starting is employed under this condition, the injected fuel does not vaporize in a desirable manner, and therefore the engine 1 may not start or a desirable starting may not be achieved.

According to the present embodiment, if the fuel pressure Pfuel is lower than the pressure P1, it inhibits the employment of combustion starting, and instead, the engine is started by the starter 73 without relying on the fuel pressure Pfuel.

In addition, according to the present embodiment, the coolant temperature Tw is detected and the pressure P1 is set in correspondence to the temperature Tw. In particular, the lower the coolant water temperature Tw, the greater the pressure P1 (FIG. 4) so that employment of combustion starting is inhibited under the condition of a low fuel pressure Pfuel, thereby securing startability when the engine 1 is cold.

According to the present embodiment, a predetermined pressure sensor 46 is provided in order to detect the fuel pressure Pfuel; nonetheless, instead of the pressure sensor 46, the elapsed time measured by a timer can be employed as the fuel pressure Pfuel. It is because there is sufficient correlation between the fuel pressure Pfuel and the time elapsed after the stop to identify the fuel pressure Pfuel (FIG. 8).

Figure 5:
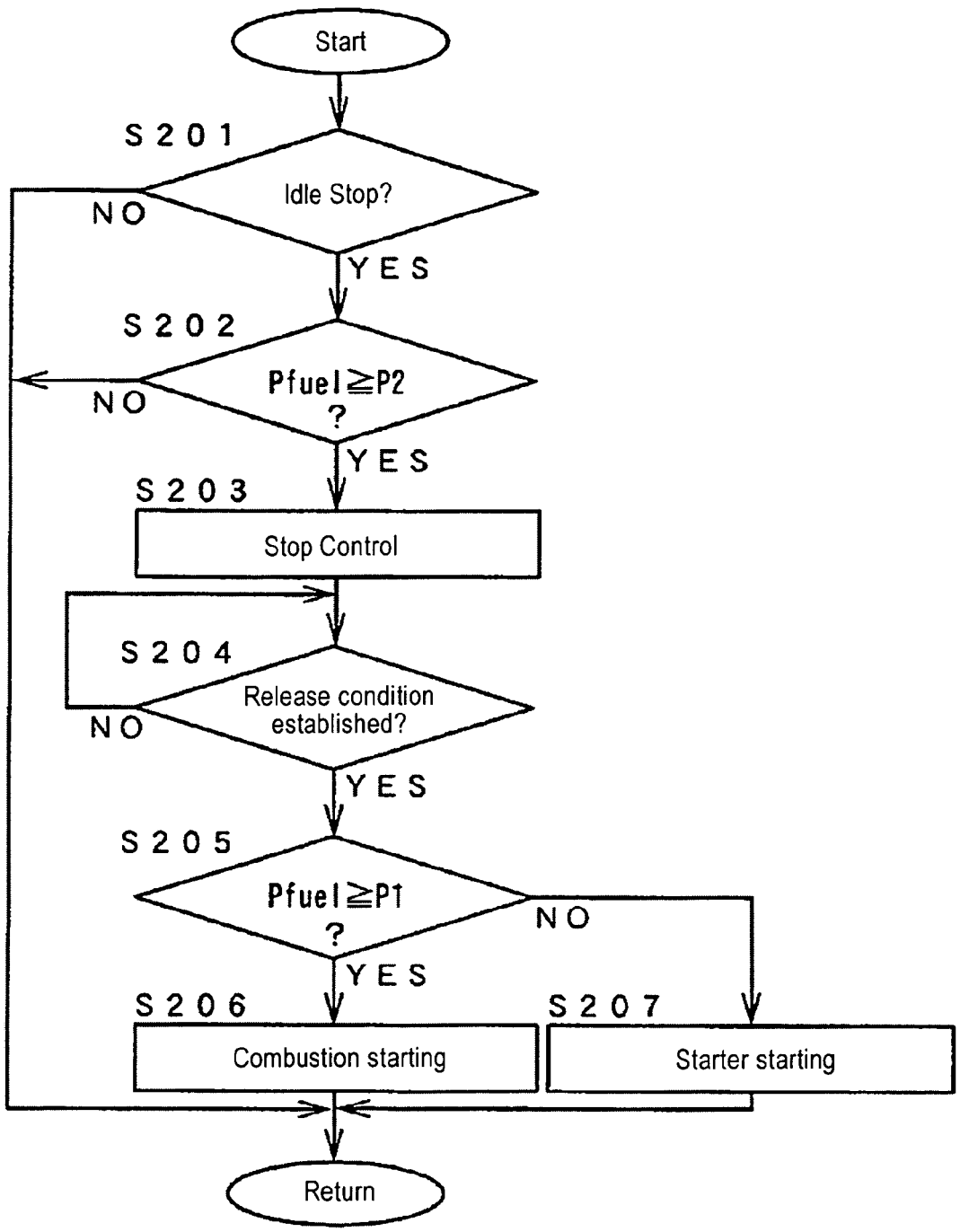
FIG. 5 is a flowchart of an idle stop control process according to a second embodiment of the present starting system.

FIG. 5 is a flowchart of the idle stop control process according to a second embodiment of the present starting system. This process is activated when the ignition switch 47 is turned on and is executed according to a predetermined cycle. The ECU 31 carries out the normal stopping of the engine when ignition switch 47 is turned off, as well as carrying out an idle stop that temporarily stops the engine 1 when an idle stop condition that is predetermined as related to vehicle speed or the like is established, until the idle stop releasing condition is later established. According to the second embodiment, the stopping position of the crankshaft 17 is detected by the crank angle sensors 42 to 44 upon the idle stop, and in addition, upon restarting after the idle stop, the cylinder that is stopped during the expansion stroke is also detected based on the detected stopping position, and combustion starting is carried out. Along with the idle stop control process, an idle stop or a restarting thereafter is carried out.

At step S201, it is detected whether or not the predetermined idle stop condition is established. When this condition is established, the process advances to step S202, and if it is not established it returns to step S201. According to the second embodiment, the idle stop is executed under the conditions: a) the accelerator aperture is the same as or smaller than a predetermined value and the accelerator pedal is in a completely returned condition; b) the vehicle speed is the same as or lower than a predetermined value and the vehicle has virtually continuously stopped for a predetermined period of time; c) a driver is stepping on a foot brake; and d) the coolant temperature is the same as or greater than a predetermined temperature. The vehicle speed can be detected by rotational speed sensors provided on driving wheels, or can be calculated based on the engine rotational speed and the transmission ratio of the gear or the like.

At step S202, the fuel pressure Pfuel detected by the pressure sensor 46 is read and it is detected whether or not the fuel pressure Pfuel is the same as the predetermined pressure (equivalent to the secondary pressure) P2 or greater. If it is the same as or greater than P2, the process advances to step S203 and if it is less than P2, the idle stop is inhibited and therefore it returns to step S202. The pressure P2 is set to a value greater than the predetermined pressure P1 as described below (P1<P2).

At step S203 injector 22 and ignition plug 23 are stopped and therefore the engine 1 is stopped.

At step S204, it is detected whether or not the predetermined idle stop releasing condition is established. If this releasing condition is established the process advances to step S205 and if it is not established it repeats the process at step S204. According to the present embodiment, the idle stop is released under the reverse condition in which the idle stop is executed, which is described above in paragraph [0042], a) to d). Therefore, for example, when a foot brake is released or an accelerator aperture having the same as or greater value than a predetermined value is detected by the accelerator sensor 41, the ECU 31 determines that the engine should start.

At step S205, it is detected whether or not the fuel pressure Pfuel is the same as the predetermined pressure (equivalent to the primary pressure) P1 or greater. If it is the same as P1 or greater the process advances to step S206 and if it is less than P1, the process advances to step S207.

At step S206, the engine 1 is activated by combustion starting.

At step S207 the engine 1 is activated by causing the starter 73 to carry out cranking.

According to the second embodiment, the process at step S202 in the flowchart shown in FIG. 5 corresponds to the function of the "idle stop inhibition means". In addition, the pressure sensor 46 has both the functions of the "primary fuel pressure detection means" and the "secondary fuel pressure detection means".

According to the second embodiment, upon idle stop the fuel pressure Pfuel is detected, and if the fuel pressure Pfuel is lower than the relatively large pressure P2, the idle stop is inhibited. Therefore, the time after the idle stop until the fuel pressure Pfuel is reduced to the pressure P1 is secured and therefore restarting by the starter 73 is avoided as much as possible, thereby saving consumption.

Figure 6:
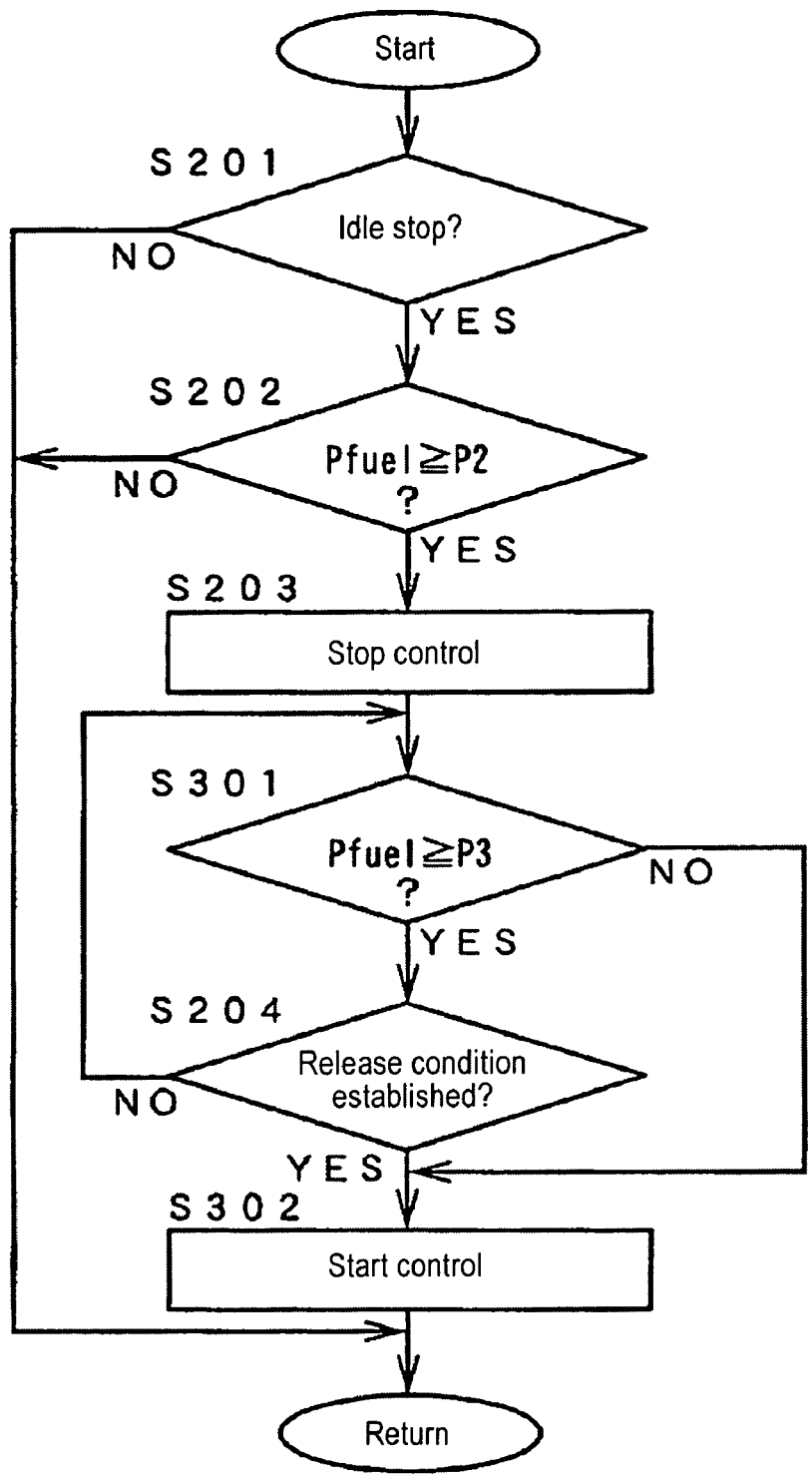
FIG. 6 is a flowchart of an idle stop control process according to a third embodiment of the present starting system.

FIG. 6 is a flowchart of the idle stop control process according to a third embodiment of the present invention.

This process, too, is activated when the ignition switch 47 is turned on, and is executed in a predetermined cycle. In this flowchart, those steps that carry out a similar process to those in FIG. 5 have the same number. According to the third embodiment, employment of combustion starting is secured for a reason described below, and therefore the engine 1 can be constructed without a starter.

Whether or not the predetermined idle stop condition is established is detected (step S201) and if the condition is established, only when the fuel pressure Pfuel is the same as or greater than the predetermined pressure (equivalent to the secondary pressure) P2, is the engine 1 stopped (steps S202, S203).

At S301, the fuel pressure Pfuel after the idle stop is monitored and whether or not this fuel pressure Pfuel is the same as or greater than the predetermined pressure (equivalent to the tertiary pressure) P3, in other words, whether or not the fuel pressure Pfuel is reduced to the pressure P3 is detected. If it is not reduced, the process advances to step S204, and if it is reduced the process advances to S302. The pressure P3 is set to a value smaller than the pressure P2.

At step S204, it is detected whether or not the predetermined idle stop releasing condition is established and the process advances to S302 only when this releasing condition is established. At step S302 the engine 1 is started by combustion starting.

According to the third embodiment, the process at step S301 in the flowchart shown in FIG. 6 corresponds to the function of the "forcible starting means". In addition, the pressure sensor 46 has all the functions of the "primary fuel pressure detection means", "secondary fuel pressure detection means" and "tertiary fuel pressure detection means".

The predetermined pressure P3 is set to be the same as or greater than the pressure (equivalent to the "primary pressure") P1 employed for starting after a normal stop, which is separate from restarting after an idle stop.

According to the third embodiment, after the idle stop, the fuel pressure Pfuel is monitored and when the fuel pressure Pfuel is reduced to the pressure P3, the engine 1 is forcibly started regardless of the establishment of the idle stop releasing condition (the transition of the fuel pressure Pfuel in this case is shown as the single dot dashed line C in FIG. 8). Therefore, combustion starting can be securely carried out during the restarting after the idle stop. In other words, the employment of combustion starting is guaranteed without having a starter.

Figure 7:
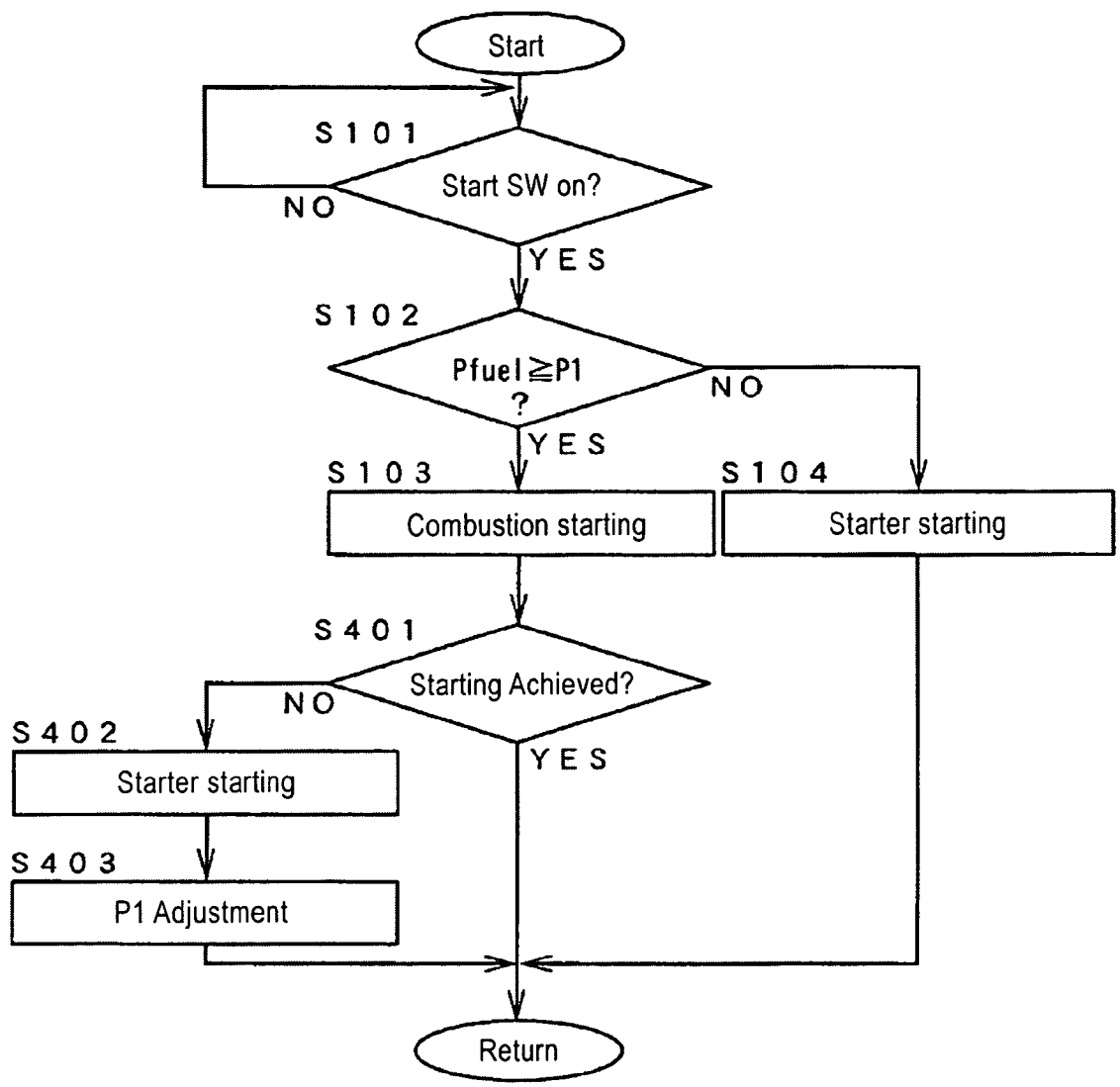
FIG. 7 is a flowchart of a starting control process according to a fourth embodiment of the present starting system.

FIG. 7 is a flowchart of the start control process according to a fourth embodiment of the present invention. This process is activated when the ignition switch 47 is turned on. In this flowchart, those steps that carry out a similar process to those in FIG. 3 have the same number. According to the present embodiment, it is detected whether or not the starting of the engine 1 by combustion starting is desirably achieved. If the starting is poor, an adjustment is made so that the value of the pressure PI that is the threshold value for determining whether to use combustion starting is increased compared to the previous starting.

When the start switch 48 is turned on (step S101), the fuel pressure Pfuel and the predetermined pressure P1 are compared and the starting method is switched between combustion starting and starting by means of the starter 73 (steps S102 to S104). When combustion starting is used (step S103), whether or not the starting of the engine is achieved is detected and if it is achieved, the present process is returned and if it is not achieved the process advances to S402.

At S402, the starting method is switched to starting carried out by cranking with the starter 73.

At S403, the pressure P1 is changed by a predetermined value to a greater value compared to the current value. According to the fourth embodiment, the pressure P1 in the table in FIG. 1 is increased by a predetermined value. It is preferable that an adjustment of the table be carried out for every range of the coolant temperature Tw. The pressure P1 after the modification (shown as double dot dash line B in FIG. 4) is reflected in the detection in step S102 for the next starting.

The detection of whether or not the starting is achieved (step S401) can be easily carried out from changes in the rotation speed of the engine after ignition is started.

According to the fourth embodiment, the process at step S401 in the flowchart shown in FIG. 7 is equivalent to the function of the "start detection means" and the process in S403 in the same flowchart is equivalent to the function of the "secondary starting pressure modification means".

According to the fourth embodiment, upon starting of the engine 1 by combustion starting, it is detected whether or not starting is achieved, and if it is not achieved, an adjustment is made so that the threshold value for determining whether to use the combustion starting (namely pressure P1) is increased for the next start, and only when a higher fuel pressure Pfuel is secured does combustion starting become employed. Therefore, the startability of the engine 1 by combustion starting can be maintained without being affected by changes due to age, such as the operability of the injector 22.

While the present starting system has been described in connection to specific embodiments thereof, this is by way of illustration and not of limitation, and the appended claims should be construed as broadly as the prior art will permit.

What is claimed is:

1. An internal combustion engine with a starting system comprising:
   a fuel pump that is driven by an output of the engine;
   an injector to directly inject fuel supplied from the fuel pump into a combustion chamber of the engine;
   an ignition to ignite the fuel in the combustion chamber;
   a fuel pressure sensor to detect the fuel pressure supplied to the injector;
   an engine position sensor to detect a cylinder position;
   a starter motor that can crank the engine when the engine is stopped; and
   a control unit that is applied to control the injector, the ignition and the starter motor; wherein
   the fuel pressure sensor detects the time elapsed from the previous stop of the engine as a value correlated to the fuel pressure;
   the control unit identifies the cylinder at the expansion stroke from the engine position sensor when the engine is stopped,
   the control unit starts the engine when the detected fuel pressure is equal to or greater than a predetermined pressure, by injecting the fuel into the combustion chamber of the cylinder at the expansion stroke and igniting the fuel, and
   the control unit drives the starter motor to start the engine when the detected fuel pressure is lower than the predetermined pressure, by cranking with the starter motor.

2. An internal combustion engine according to claim 1, wherein the control unit is configured to inject the fuel into the combustion chamber and ignite the fuel in response to the engine rotation after starting the engine rotation by cranking with the starter motor.

3. An internal combustion engine according to claim 1, wherein the control unit is configured to selectively carry out an idle stop to temporarily stop the engine when a predetermined idle stop condition is established and until a predetermined idle stop releasing condition is established; and the control unit is configured to inhibit the idle stop when the fuel pressure is lower than a predetermined secondary pressure that is greater than the predetermined pressure.

4. An internal combustion engine according to claim 1, wherein the control unit is configured to selectively carry out an idle stop to temporarily stop the engine when a predetermined idle stop condition is established and until a predetermined idle stop releasing condition is established; and the control unit is configured to forcefully start the engine after the idle stop when the fuel pressure detected by a tertiary fuel pressure sensor reaches the predetermined pressure or a tertiary pressure that is greater then the predetermined pressure and lower than a secondary pressure.

5. An internal combustion engine according to claim 1, further comprising:

a temperature detection sensor for detecting the temperature of the engine; and the control unit is configured to modify the predetermined pressure depending on the temperature detected by the temperature sensor.

6. An internal combustion engine according to claim 1, further comprising:

a starting sensor for detecting whether or not engine starting by the primary start control unit was achieved; and the control unit is configured to increase the predetermined pressure compared to that during the previous stopping for the next starting when a condition is detected other than the condition in which engine starting is achieved by the control unit.

7. A method for starting an internal combustion engine, the internal combustion engine having a fuel pump drivable by the output of the engine, an injector for directly injecting fuel supplied by the fuel pump into a combustion chamber, and an ignition plug for igniting the fuel injected by the injector, the method comprising:

detecting the fuel pressure supplied to the injector;

identifying a cylinder at the expansion stroke when the engine is stopped;

detecting the time elapsed from the previous stop of the engine as a value correlated to the fuel pressure;

starting the engine when the detected fuel pressure is equal to or greater than a predetermined pressure by injecting the fuel into the combustion chamber of the cylinder at the expansion stroke and igniting the fuel; and driving a starter motor to start the engine when the detected fuel pressure is lower than the predetermined pressure, by cranking with the starter motor.

8. A method according to claim 7, further comprising:

injecting the fuel into the combustion and igniting the fuel in response to engine rotation after starting the engine rotation by cranking with the starter motor.

9. A method according to claim 7, further comprising:

carrying out an idle stop to temporarily stop the engine when a predetermined idle stop condition is established and until a predetermined idle stop releasing condition is established, and inhibiting the idle stop when the detected fuel pressure is lower than a predetermined secondary pressure that greater than a predetermined primary pressure.

10. A method according to claim 7, further comprising:

carrying out an idle stop to temporarily stop the engine when a predetermined idle stop condition is established and until a predetermined idle stop releasing condition is established, and starting forcefully the engine after the idle stop when the fuel pressure detected by a tertiary fuel pressure sensor reaches a primary pressure or a tertiary pressure that is greater than the primary pressure and lower than a secondary pressure.

11. A method according to claim 7, further comprising:

detecting the temperature of the engine, and modifying the predetermined pressure depending on the temperature detected by the temperature sensor.

12. A method according to claim 7, further comprising:

detecting whether or not engine starting by a primary start control unit was achieved, and increasing the predetermined pressure compared to that during a previous stopping for the next starting when a condition is detected other than the condition in which engine starting is achieved by the primary start control unit.

13. An internal combustion engine with a starting system comprising:

a fuel pump that is droved by an output of the engine;

an injector to directly inject fuel supplied from the fuel pump into a combustion chamber of the engine;

an ignition to ignite the fuel in the combustion chamber;

means for detecting the fuel pressure supplied to the injector;

means for detecting a cylinder position;

a starter motor that can crank the engine when the engine is stopped; and a control unit that is applied to control the injector, the ignition and the starter motor; wherein the fuel pressure sensor detects the time elapsed from the previous stop of the engine as a value correlated to the fuel pressure;

the control unit for identifies the cylinder at the expansion stroke from cylinder position detecting means when the engine is stopped, the control unit starts the engine when the fuel detecting means detects fuel pressure that is equal to or greater than a predetermined pressure, by injecting the fuel into the combustion chamber of the cylinder at the expansion stroke and igniting the fuel, and the control unit drives the starter motor to start the engine when the detecting fuel means detects fuel pressure that is lower than the predetermined pressure, by cranking with the starter motor.

* * * * *